United States Patent [19]

Tzong et al.

[11] Patent Number: 5,186,822
[45] Date of Patent: Feb. 16, 1993

[54] WAVE POWERED DESALINATION APPARATUS WITH TURBINE-DRIVEN PRESSURIZATION

[75] Inventors: Tsair-Jyh Tzong, La Palma; Frank H. Y. Wu, Pasadena; Chan-Feng Tsai, Arcadia, all of Calif.

[73] Assignee: Ocean Resources Engineering, Inc., South Pasadena, Calif.

[21] Appl. No.: 659,699

[22] Filed: Feb. 25, 1991

[51] Int. Cl.$^5$ .................................. B01D 61/12
[52] U.S. Cl. ........................ 210/122; 60/398; 60/499; 210/170; 210/257.2; 290/42; 417/331; 417/405
[58] Field of Search ............. 210/121, 122, 170, 258, 210/257.2, 321.6, 416.1, 416.3, 747, 97, 134; 405/76; 417/330, 331, 405; 203/10, 11, DIG. 17, DIG. 20; 60/398, 497, 499–501; 290/42, 53; 415/7

[56] References Cited

U.S. PATENT DOCUMENTS

| | | | |
|---|---|---|---|
| 3,487,228 | 12/1969 | Kriegel | 290/52 |
| 3,754,147 | 8/1973 | Hancock | 290/53 |
| 4,120,756 | 10/1978 | Carman | 203/11 |
| 4,189,918 | 2/1980 | Moody | 60/398 |
| 4,260,901 | 4/1981 | Woodbridge | 290/42 |
| 4,279,124 | 7/1981 | Schremp | 60/505 |
| 4,326,840 | 4/1982 | Hicks | 417/331 |
| 4,335,576 | 6/1982 | Hopfe | 60/398 |
| 4,363,703 | 12/1982 | Fidifrawi | 203/10 |
| 4,400,940 | 8/1983 | Watabe et al. | 417/330 |
| 4,421,461 | 12/1983 | Hicks | 417/53 |
| 4,441,316 | 4/1984 | Moody | 60/398 |
| 4,480,966 | 11/1984 | Smith | 417/332 |
| 4,490,232 | 12/1984 | Lapeyre | 290/42 |
| 4,512,886 | 4/1985 | Hicks | 210/170 |
| 4,555,307 | 11/1985 | Hagen | 203/11 |
| 4,594,853 | 6/1986 | Raichlen | 60/502 |
| 4,624,623 | 11/1986 | Wagner | 416/19 |
| 4,672,222 | 6/1987 | Ames | 290/53 |
| 4,698,969 | 10/1987 | Raichlen et al. | 417/331 |
| 4,770,775 | 9/1988 | Lopez | 210/321 |

FOREIGN PATENT DOCUMENTS

| | | | |
|---|---|---|---|
| 57-68570 | 4/1982 | Japan | 60/398 |
| 553326 | 4/1977 | U.S.S.R. | 210/747 |

Primary Examiner—Robert A. Dawson
Assistant Examiner—Joseph Drodge
Attorney, Agent, or Firm—Fulwider, Patton, Lee & Utecht

[57] ABSTRACT

A desalination apparatus including pressure responsive desalination means, a storage tank and conduit means connecting such storage tank to a pump mounted in a caisson defining a resonant chamber having an opening in one side thereof for receiving the incoming ocean waves. The caisson is configured in accordance with the natural frequency of the incoming waves and amplify such waves to drive a float coupled with the pump. Actuation of such pump pressurizes the storage tank to drive brine through the desalination means for separating therefrom potable water. The apparatus includes a turbine generator arranged to facilitate the pressurizing of the brine.

2 Claims, 1 Drawing Sheet

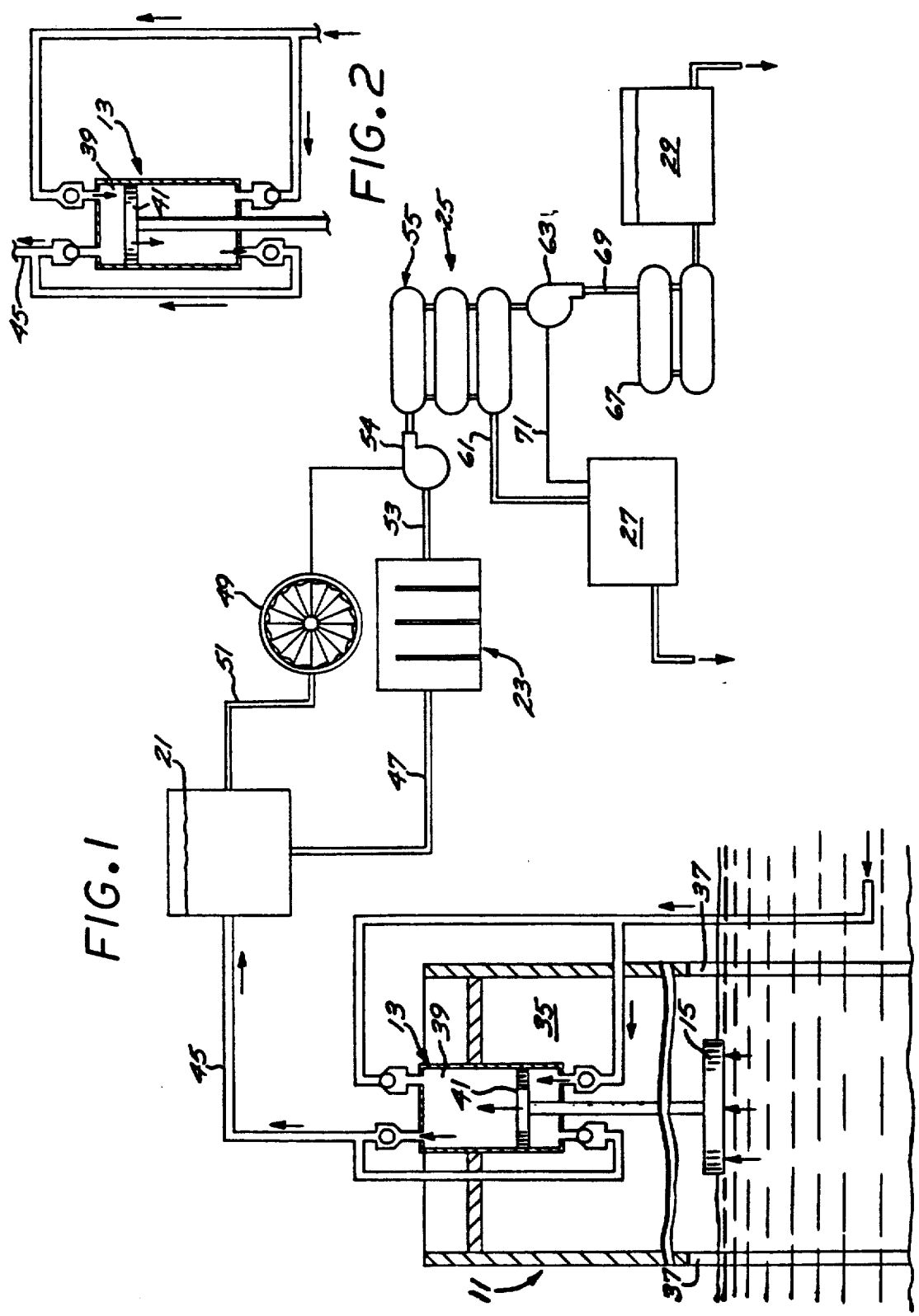

WAVE POWERED DESALINATION APPARATUS WITH TURBINE-DRIVEN PRESSURIZATION

BACKGROUND OF THE INVENTION

1. Field of the Invention

The present invention relates to an apparatus for efficiently extracting potable water from the ocean.

2. Description of the Prior Art

With the continuing expansion of world population, the need for new sources of potable water has been long recognized. These needs have led to the development of numerous different prior art devices for extracting fresh water from the ocean. Other efforts have explored various mechanisms for converting the hydrokinetic energy of waves into useable energy. These devices may be broken into two general categories. One category relates to various piston type pumps carried from articulated framework including a float fluctuated by waves. The system is then typically moored from the ocean floor in hopes that the undulating ocean surface will induce sufficient consistent relative movement between the piston pump and the cylinder housing to thereby reciprocate the piston to pump fluid therefrom to generate a pressure from which energy may be extracted. Devices of this general description are shown in U.S. Pat. No. 3,487,228 to Kriegel, U.S. Pat. No. 4,260,901 to Woodbridge, U.S. Pat. No. 4,421,461 to Hicks and U.S. Pat. No. 4,335,576 to Hopfe. Such devices, while being acceptable for their intended purpose, suffer the shortcoming that they do not reliably produce sufficient energy for operation of a reverse osmosis type desalination device.

Other wave powered generators have been proposed which are anchored to the ocean floor and incorporate a piston style pump driven by a float contained within a resonant chamber exposed to incoming waves and configured to amplify such waves. A device of this type is shown in U.S. Pat. No. 4,594,853 to Raichlen et al. and assigned to the assignee of this application. Such devices have proven efficient to generate power but, heretofore, have not been employed in combination with a desalination device for separating fresh water from brine.

Efforts to harness the ocean waves for the purpose of distilling fresh water from the ocean have led to proposals that movement of the waves be harnessed to generate a partial vacuum to thereby vaporize fresh water from the ocean water. A device of this type is shown in U.S. Pat. No. 4,120,756 to Carman. While such devices are satisfactory for their intended purpose, they suffer the shortcoming that the unamplified waves have proven inefficient for continuously and repeatedly generating a high partial vacuum for efficient production of a practical volume of vapor.

Efforts to devise an efficient wave powered desalination system have led to the proposal of a piston pump the water through a heat exchanger, evaporator and condenser. The piston was driven in a conventional articulated cylindrical housing and piston arrangement coupled with a float. A device of this type is shown in U.S. Pat. No. 4,555,307 to Hagen. While acceptable for its intended use, such a device fails to provide the desired low cost, reliable and highly efficient desalination mechanism having ready practical application.

Consequently, there exists a need for a desalination apparatus which is sturdy in construction, resistant to the elements and which is dependent only on the undulating ocean water for its power source.

SUMMARY OF THE INVENTION

The present invention is characterized by a caisson defining a resonant chamber open in the direction of oncoming waves and sized to amplify such waves to drive a piston which is coupled with a pump. The pump pressurizes water for storage and to be driven through a pressure responsive desalination unit, such as a reverse osmosis type device.

Other objects and features of the invention will become apparent from consideration of the following description taken in connection with the accompanying drawing.

DESCRIPTION OF THE DRAWING

FIG. 1 is a schematic view of wave driven desalination apparatus embodying the present invention; and FIG. 2 is a partial schematic view, in enlarged scale, of the ocean driven pump incorporated in FIG. 1.

DESCRIPTION OF THE PREFERRED EMBODIMENT

The desalination apparatus of the present invention includes, generally, a caisson housing 11 open on the side toward incoming waves and mounting a double acting pump 13 driven by a float 15. The pump 13 is connected through a storage tank, generally designated 21, to a pretreatment unit, generally designated 23. The unit 23 is connected with a two stage reverse osmosis desalination device, generally designated 25, which separates brine and fresh water for storage in a brine tank 27 and fresh water tank 29, respectively.

The ocean has been long recognized as a source of power. Likewise, man has made many efforts efficiently and effectively extract fresh water therefrom on a practical basis. However, the power requirement for conventional desalination units is so great as to render use thereof on a regular basis somewhat impractical. With current day climatic conditions dictating extended droughts in various populated areas and the population explosion in arid regions, water shortages have become more acute. This has led to disputes over water rights and even to water rationing. With the abundance of readily accessible ocean water in many of these areas experiencing water shortages, there exists a great demand for a wave powered desalination device which is reliable in operation and which has the capacity to produce fresh water on a high volume scale.

The desalination apparatus of the present invention takes advantage of the fact that a caisson 11 can be constructed of a stationary concrete housing anchored to the ocean floor on the continental shelf and which may be constructed in a sturdy fashion to resist storms, tidal waves, tornados, as well as the corrosive ocean atmosphere while serving to protect the interior thereof from direct impact by excessive wave action. As recognized in U.S. Pat. No. 4,594,853 assigned to the assignee of the instant application, a resonant chamber may be constructed of such a size as to amplify the wave action or energy to thus provide a greater amount of energy than would be the case for a free standing wave.

The first or principal mode that occurs in an oscillating system is sometimes referred to as a "fundamental mode". It is important to the present invention that the caisson 11 be constructed with an interior resonant chamber 35 which operates in the fundamental mode of the ocean waves. Thus, the cross section of the resonant chamber 35 should be constructed such that its equivalent diameter is from 0.15 L/pi to L/pi, where L is the length between the wave crest entering the chamber through the opening 37.

The pump 13 is a dual acting pump including the housing 39 housing the reciprocal piston 41 coupled with the float 15. The usual one-way valve is provided such that driving of the piston 41 in one direction draws sea water into one end of the chamber 39 while expelling it from the other and visa a versa.

In the preferred embodiment, the storage tank 21 is located on an elevation, such as a hill or cliff, high above the elevation of the caisson 11, such that pumping of water thereto through the conduit 45 provides a head of water which may be subsequently used for pressurization. In the preferred embodiment, the entire system is closed such that it may be further pressurized by actuation of the pump 13 to maintain a pressure in the tank 21.

For the purpose of the present invention, the tank 21 and associated conduit system may be closed to act as a pressure accumulator to provide for the accumulation of pressure to be utilized separately or in conjunction with a head of water generated by elevation of the tank.

A first outlet from the tank 21 is connected with the preconditioning unit 23 by means of a conduit 47 and a second outlet is connected with the turbine of an electric generator 49 by means of a conduit 51.

The outlet of the preconditioning unit is connected with a water pump 54 by means of a conduit 53 and the outlet thereof is connected with the first stage, generally designated 55, of the desalination device 25. A brine outlet of the first stage 55 is connected with the brine tank 27 by means of a conduit 61 and the fresh water outlet is connected with a water pump 63, the outlet of which is connected with a second stage desalination device 67 by means of a conduit 69. A flow controller in the brine tank 27 is connected with the second stage pump 63 by means of an electric lead 71. The outlet from the second stage desalination device 67 is connected with the fresh water storage tank 29.

In operation, it will be appreciated that one of the advantages of the present invention is that the power source for desalination may be constructed in the relatively shallow water on the continental shelf, as for instance about 30 feet of water, or the caisson itself 11 may be actually mounted on the ocean side of a rock or concrete barrier defining a break water. The caisson 11 may itself be constructed of reinforced concrete having sufficient structural integrity to resist damage from even the most oversized incoming waves and being relatively impervious to the marine environment. It will be appreciated that with the storage tank 21 installed at a higher elevation, the pump 13 will serve to pump ocean water to that elevation, thus creating a natural water head providing pressure for operation of the turbine generator 49 and for flow through the pretreatment unit 23. Also, containment of pressure in the system permits the pump 13 to augment the pressure build up. It will be appreciated that for some installations, it will be desirable to rely solely on the accumulation of pressure to actuate the pretreatment unit 23 and desalination device 25.

It will be appreciated that the incoming waves will pass through the opening 37 and be amplified within the resonant chamber 35 to impose a cyclical force on the buoyant float 15 to reciprocate the piston 41 and pump sea water to the elevated storage tank 21.

Water from the turbine generator 49 may then be expelled back to the ocean or, if desirable, recirculated as preferred. The pressurized water is passed through the pretreatment unit for filtration and removal of solids and residue which may otherwise interfere with the desalination process. In practice, the unit may incorporate filters for removal of course sedimentation, ultra filtration for finer particles and various combinations thereof or, in addition, actual sedimentation arrangements. The pretreated water is then introduced to the pump 54 which acts as a pressure accumulator to supply pressurized ocean water to the first stage 55 of the desalination device 25. The water desalination process may then take place by reverse osmosis, electrolysis, ion exchange, vacuum evaporation, distillation or other desired means. It will be apparent to those skilled in the art that the electricity generated by the turbine generator 49 may likewise be utilized as an energy source for such desalination device 25.

Brine expelled from the first stage 55 will then be stored in the brine tank 27 for subsequent use in manufacturing procedures or direct discharge to the ocean.

The fresh water exhausted from the first stage 55 is passed through the pressure accumulator 63 to raise the pressure thereof to be introduced into the second stage 67. The finished product is then stored in a fresh water tank 29 for subsequent use as demand dictates.

It will be apparent from the foregoing that the self-contained wave powered desalination system of the present invention provides a reliable and maintenance free device for generation of a practical volume of potable water at a relatively economic rate.

Various modifications and changes may be made with regard to the foregoing detailed description without departing from the spirit of the invention.

What is claimed is:

1. A wave powered desalination apparatus for disposition in a body of undulating ocean water and comprising:
  a caisson formed by vertical wall means for disposition in the ocean, defining a chamber formed with an opening arranged to face in a direction of wave propagation for flow therethrough of such ocean waves;
  a float in said chamber;
  a water pressure pump coupled with an driven by said float and having an inlet and outlet;
  a feed conduit leading from said chamber to said inlet for feeding ocean water thereto;
  a water accumulator tank means for storage of water to build water pressure up to a selected pressure and having a tank inlet and first and second tank outlets;
  water desalination means operative in response to a predetermined water pressure higher than said selected pressure to separate potable water from ocean water;
  a turbine generator connected with said first outlet from said tank and operative in response to said selected pressure to generate electricity;
  a pressure accumulator operative to raise water pressure of water flowing therethrough from said selected pressure to said predetermined pressure;
  an electric drive motor drivingly coupled with said pressure accumulator and connected with said turbine generator for driving said generator; and conduit means connecting said outlet of said pump with said tank inlet to said tank and said second outlet of said tank with said turbine generator, said pressure accumulator and said desalinating means to cause said pump to pump water into said water tank to raise the pressure thereof to said selected pressure and to cause water at said selected pressure to drive said turbine generator to drive said pressure accumulator to raise the pressure of ocean water flowing therethrough from said selected to said predetermined pressure to render said desalination means operative to produce potable water.

2. A wave powered desalination apparatus according to claim 1 wherein:

said conduit means and storage tank are configured to maintain pressure such that actuation of said pump pressurizes water in said tank.

* * * * *